United States Patent
Fujioka

[11] Patent Number: 5,698,836
[45] Date of Patent: Dec. 16, 1997

[54] IC CARD

[75] Inventor: Shuzo Fujioka, Hyogo, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 509,691

[22] Filed: Jul. 31, 1995

[30] Foreign Application Priority Data

Mar. 29, 1995 [JP] Japan .................. 7-071777

[51] Int. Cl.$^6$ .................. G06K 19/06; G06K 5/00
[52] U.S. Cl. .................. 235/492; 235/380
[58] Field of Search .................. 235/492, 375, 235/380, 382; 902/26; 364/825.31; 382/2

[56] References Cited

U.S. PATENT DOCUMENTS

| | | | |
|---|---|---|---|
| 4,882,474 | 11/1989 | Anderl et al. | 235/492 X |
| 4,928,001 | 5/1990 | Masada | 235/492 X |
| 5,191,192 | 3/1993 | Takahira et al. | 235/492 X |
| 5,274,220 | 12/1993 | Fukuoka et al. | 235/487 |
| 5,384,454 | 1/1995 | Iijima | 235/492 |

FOREIGN PATENT DOCUMENTS

| | | | |
|---|---|---|---|
| 38 09 795 C2 | 3/1988 | Germany . | |
| 404160584 | 6/1992 | Japan | 235/492 |
| 406036088 | 2/1994 | Japan | 235/492 |
| 87/02160 | 9/1985 | WIPO . | |
| 87/07062 | 4/1987 | WIPO . | |
| 87/07063 | 4/1987 | WIPO . | |

OTHER PUBLICATIONS

German Office Action, Dec. 11, 1996 (translation included).

*Primary Examiner*—Donald T. Hajec
*Assistant Examiner*—Thien Minh Le
*Attorney, Agent, or Firm*—Lowe, Price, LeBlanc & Becker

[57] ABSTRACT

In an IC card, a user area is set to have a first area in which a write password is made valid, and a second area in which a read password is made valid. When a write command for the first area is sent together with a password from a read/write apparatus, the password is collated with the write password. When a read command for the second area is sent together with a password, the password is collated with the read password. As a result of the collation, when the passwords are identical, the respective commands are executed.

5 Claims, 14 Drawing Sheets

IC CARD

BACKGROUND OF THE INVENTION

1. Field of the Invention

The present invention relates to a non-contact type Ic card in which data is transmitted or received by using a carrier wave such as radio wave.

2. Description of the Related Art

For example, a system is being developed in which a non-contact type IC card is used as a commuter pass for train, and it is checked whether or not the commuter pass is valid based on data transmission between the IC card and a read/write apparatus disposed at a ticket gate.

FIG. 13 is a sequence chart showing communication between the IC card and the read/write apparatus in the conventional non-contact type IC card system. Initially, the read/write apparatus transmits a read identifier command to the IC card. After receiving the read identifier command, the IC card transmits an identification code inherent in the IC card to the read/write apparatus. The read/write apparatus transmits a command to be executed by the card, the identification code and a password of the IC card serving as a transmission target with the execution command. The IC card collates the identification code and the password sent from the read/write apparatus. Only when the identification code and the password are identical with an identification code and a password stored in the IC card, the IC card executes the command instructed by the read/write apparatus, and transmits the result of execution to the read/write apparatus. When the read/write apparatus requires the IC card to execute other commands by the IC card, the read/write apparatus adds the identification code and the password of the IC card to the corresponding execution command and transmits the data. The identification code and the password are collated again on the side of the IC card. The command is executed only when the identification code and the password are respectively identical, and the result of execution is transmitted to the read/write apparatus. In a similar manner, each time the read/write apparatus transmits the execution command to the IC card, the read/write apparatus transmits the identification code and the password with the execution command, and the IC card executes the command after collation thereof. Hence, for example, in order to write one-byte data onto the IC card, the read/write apparatus should add ten and several bytes to a command for transmission of the identification code and the password, resulting in a decreased efficiency of transmission. In particular, many of such IC cards obtain power supply by rectifying a radio wave from the read/write apparatus. Therefore, highly efficient data transmission has been specially desired.

FIG. 14 is a diagram showing a memory map in the conventional IC card. As shown in the drawing, a user area is divided into blocks, and each block has a password corresponding to each block separately from a system area access password for access to a system area of the IC card. Further, each time the command is executed, a flag including the result of collation of the password or the identification code is set or reset.

Since the conventional non-contact type IC card is provided as set forth above, the read/write apparatus transmits to the IC card the identification code, the password, and so forth for each transmission of the command. Thus, there has been desired a non-contact type IC card which can ensure security, and enables highly efficient data transmission.

SUMMARY OF THE INVENTION

The present invention is made in order to overcome the above problems, and it is an object of the present invention to provide a non-contact type IC card which can ensure security, and enables highly efficient data transmission.

According to the present invention, there is provided an IC card including a memory having a system area storing a write password used for collation when data is written onto a first area in a user area, a read password used for collation when data is read out into a second area in the user area, and a system password used for collation when data is written onto or read from the system area, write password collating means for, when a write command for the first area is sent together with a password from a read/write apparatus, collating the password with the write password stored in the memory so as to decide whether or not the passwords are identical with each other, read password collating means for, when a read command for the second area is sent together with a password from the read/write apparatus, collating the password with the read password stored in the memory so as to decide whether or not the passwords are identical with each other, system password collating means for, when a read or write command for the system area is sent together with a password from the read/write apparatus, collating the password with the system password stored in the memory so as to decide whether or not the passwords are identical with each other, and command executing means for executing a command sent from the read/write apparatus when the respective passwords are identical with those stored in the memory depending upon the results of collation in the write password collating means, the read password collating means, and the system password collating means. As stated above, the write password, the read password, and the system password are stored in the memory. Further, the command executing means executes the command sent from the read/write apparatus only when the respective passwords are identical with each other depending upon the results of collation in the write password collating means, the read password collating means, and the system password collating means. As a result, it is possible to efficiently use the memory by using a small number of passwords. Further, according to the present invention, there is provided an IC card in which a memory has a third area which is included in a first area, and is also included in a second area. Hence, a user area can be divided into three areas having different security levels, and can be controlled by two passwords, thereby more effective use of the memory can be realized.

Further, according to the present invention, there is provided an IC card including a memory having a system area storing a password used for collation when the memory is accessed, password collating means for, when a command for access to the memory is inputted together with a password from a read/write apparatus, collating the password with the password stored in the memory so as to decide whether or not the passwords are identical with each other, password collation result holding means for holding the result of password collation made by the password collating means, and command executing means for, when a command for access to the memory is inputted together with a password from the read/write apparatus, executing the command depending upon the result of collation in the password collating means, and for, when a command for access to the memory is inputted without a password from the read/write apparatus, executing the command depending upon the result of password collation held by the password collation result holding means. As stated above, the password collation result holding means holds the result of password collation made by the password collating means. Further, when a command for access to the memory is inputted without a password, the command executing means executes the command depending upon the result of password collation held by the password collation result holding means. As a result, it is possible to omit unnecessary password transmission, and improve an efficiency of transmission.

Further, according to the present invention, there is provided an IC card including write password collation result holding means for holding the result of password collation made by the write password collating means, read password collation result holding means for holding the result of password collation made by the read password collating means, and system password collation result holding means for holding the result of password collation made by the system password collating means. In the IC card, when a command is sent with a password from a read/write apparatus, command executing means executes the command sent from the read/write apparatus when the respective passwords are identical with each other depending upon the results of collation in the write password collating means, the read password collating means, and the system password collating means. Alternatively, when a command is sent without a password from the read/write apparatus, the command executing means executes the command depending upon the result of collation held in the write password collation result holding means, the read password collation result holding means, or the system password collation result holding means. As a result, it is possible to enhance an efficiency of data transmission, and provide higher security.

Further, according to the present invention, there is provided an IC card including a system area having an area storing an identification code. The IC card further includes identification code collating means for, when an identification code is sent together with a command from a read/write apparatus, collating the identification code with the identification code stored in the memory so as to decide whether or not the identification codes are identical with each other, and identification code collation result holding means for holding the result of collation in the identification code collating means. In the IC card, when a command is sent together with an identification code from the read/write apparatus, command executing means executes the command depending upon the result of collation in the identification code collating means. Alternatively, when a command is sent without an identification code from the read/write apparatus, the command executing means executes the command depending upon the result of identification code collation held in the identification code collation result holding means. As a result, there is an effect in that an efficiency of data transmission can be more enhanced.

Further, according to the present invention, there is provided an IC card in which password collation result holding means holds the result of password collation only when no transmission error is caused in communication at a time of transmission of a command from a read/write apparatus. As a result, it is possible to more accurately check password error.

Further, according to the present invention, there is provided an IC card in which identification code collation result holding means holds the result of identification code collation only when no transmission error is caused in communication at a time of transmission of a command from a read/write apparatus. As a result, it is possible to more accurately check identification code error.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.

Embodiment 1

Figure 1:
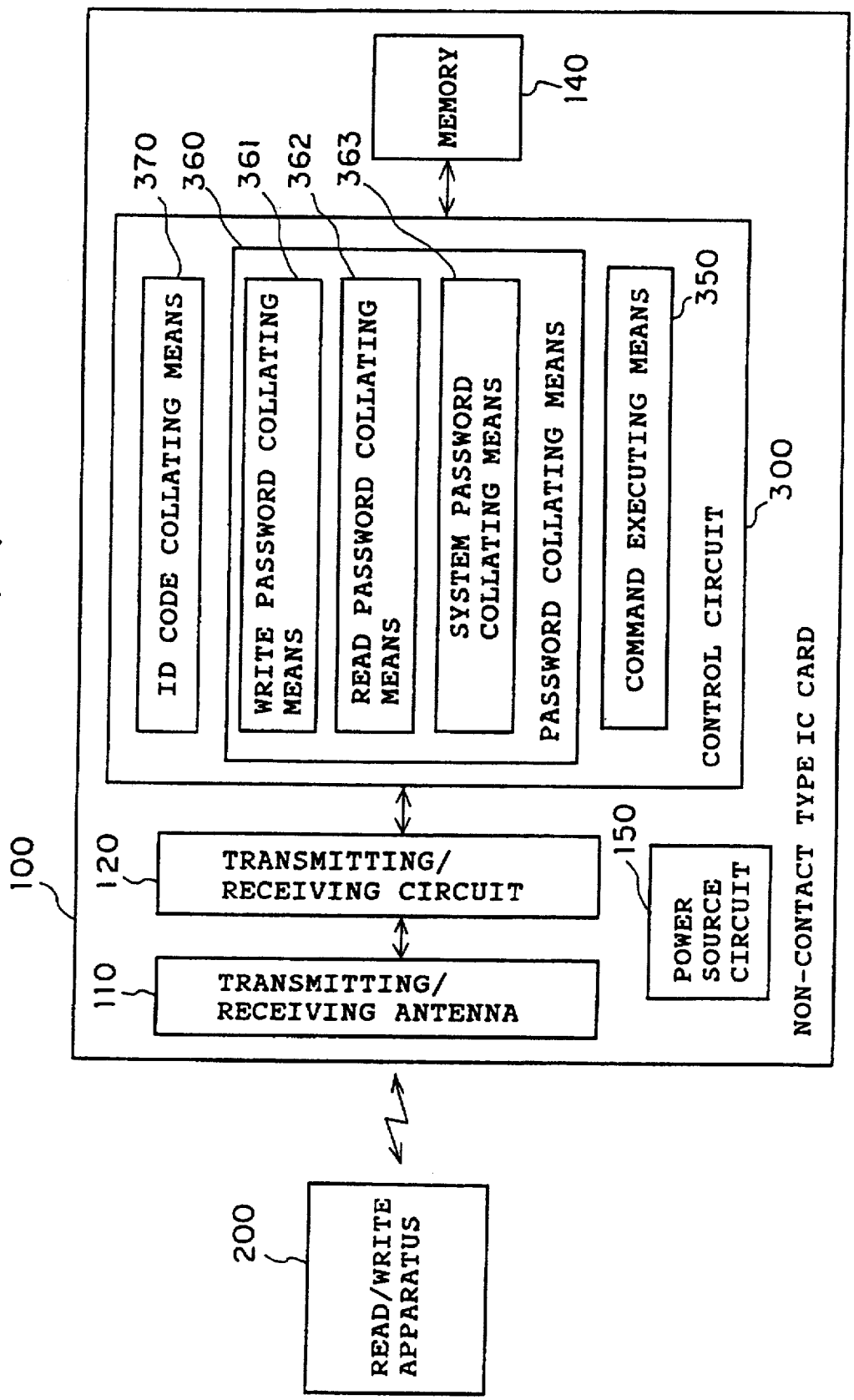
FIG. 1 is a block diagram showing, together with a read/write apparatus, a basic structure of a first embodiment of a non-contact type IC card of the present

FIG. 1 is a block diagram showing, together with a read/write apparatus, a basic structure of a non-contact type IC card in the embodiment 1 of the present invention. In the drawing, reference numeral 100 denotes the non-contact type IC card, 200 denotes the read/write apparatus for communicating with the non-contact type IC card 100, 110 denotes a transmitting/receiving antenna to convert electric information into a radio wave, and convert the radio wave into a high-frequency signal for transmission and reception of the radio wave between the read/write apparatus and the antenna. Further, reference numeral 120 denotes a transmitting/receiving circuit for converting the high-frequency signal converted by the transmitting/receiving antenna 110 into a digital signal, and convert the digital signal into a high-frequency signal to be supplied to the transmitting/receiving antenna 110, 140 denotes a programmable memory for storing data, 150 denotes a power supply circuit for supplying power to each section of the non-contact type IC card 100. Further, reference numeral 300 denotes a control circuit for controlling each section of the non-contact type IC card 100, and to process data which is written onto or read from the non-contact type IC card 100. A small battery may be employed as the power source circuit 150, or a dc power supply may be obtained by rectifying the received radio wave.

Figure 2:
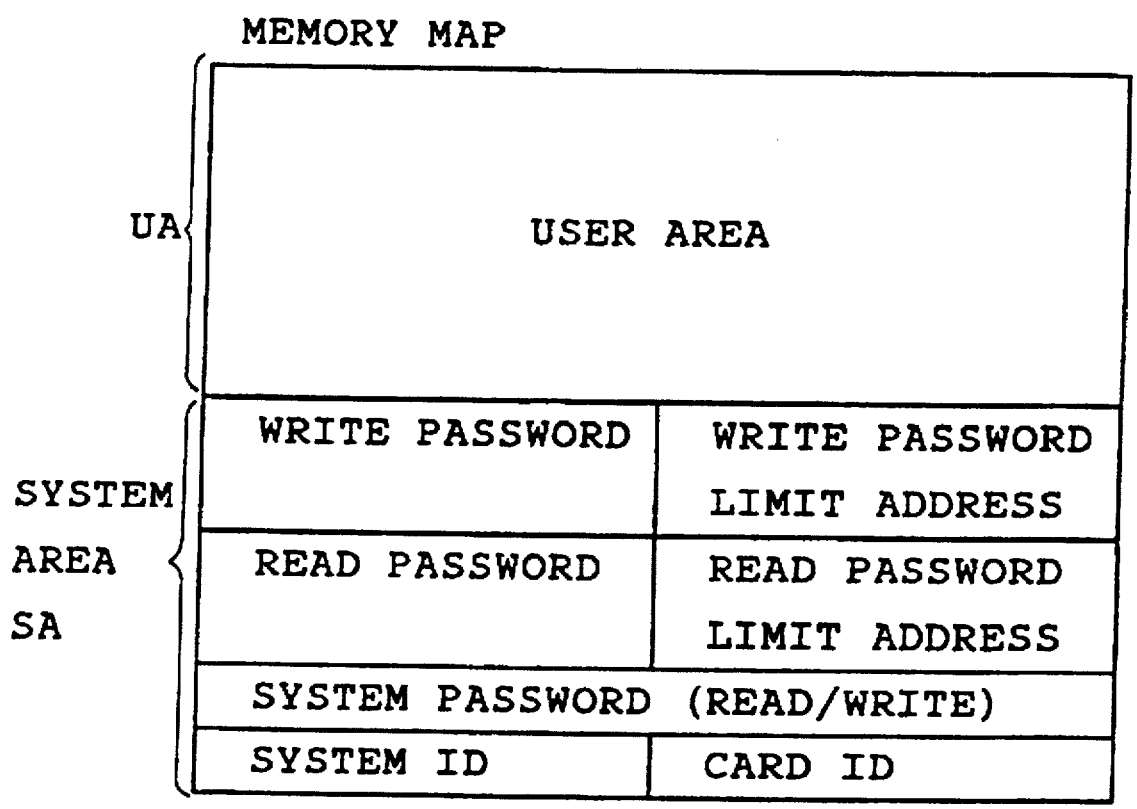
FIG. 2 is a diagram showing a memory map of a memory in the first embodiment.

FIG. 2 is a diagram showing a memory map of the memory 140 in this embodiment. As shown in the drawing, the memory 140 is divided into a user area UA and a system area SA. The user area UA is an area used for application data such as personal information or account data of a user of the non-contact type IC card 100. The system area SA is an area used to control the card. The system area SA includes a system identifier, a card identifier, a system password, a read password, a read password limit address, a write password, and a write password limit address. The system identifier is used to identify in which system the card can be used. In addition, the card identifier is used to identify the non-contact type IC card 100. The system password is a password used for collation during reading from or writing to the system area. The read password and the write password are passwords which are respectively used for collation during reading from and writing to the user area UA. Further, the read password limit address is a high limit address under which the read password is made valid, and the write password limit address is a high limit address under which the write password is made valid.

Reference numeral 361 denotes a write password collating means for, when a write command for the user area UA is sent together with a password from the read/write apparatus 200, collating the password with the write password stored in the memory 140 so as to decide whether or not the passwords are identical with each other. Reference numeral 362 denotes a read password collating means for, when a read command for the user area UA is sent together with a password from the read/write apparatus 200, collating the password with the read password stored in the memory 140 so as to decide whether or not the passwords are identical with each other. Reference numeral 363 denotes a system password collating means for, when a read command or a write command for the system area SA is sent together with a password from the read/write apparatus 200, collating the password with the system password stored in the memory 140 so as to decide whether or not the passwords are identical with each other. Reference numeral 350 denotes a command executing means for executing the command sent from the read/write apparatus 200 when the respective passwords are identical with each other depending upon the results of collation in the write password collating means 361, the read password collating means 362, and the system password collating means 363. Further, the write password collating means 361, the read password collating means 362, and the system password collating means 363 form password collating means 360. In addition, reference numeral 370 denotes an identification code collating means for, when an identification code is sent together with a command from the read/write apparatus 200, collating the identification code with an identification code stored in the memory 140.

A description will now be given of the operation of the non-contact type IC card in the embodiment. First, a brief description will be given of whole operation of communication between the read/write apparatus 200 and the non-contact type IC card 100. Initially, the read/write apparatus 200 sends to the non-contact type IC card 100 an identifier read command serving as a command to read the identification code. The non-contact type IC card 100 sends back both of (or any one of) the system identifier and the card identifier in the system area SA. The read/write apparatus 200 identifies the system identifier from the non-contact type IC card 100, thereby deciding whether or not the non-contact type IC card 100 is issued for use in the system. If service is changed depending upon the card identifier, the read/write apparatus 200 further identifies the card identifier. Next, when the user area UA is read, in order to read data at lower address than the read password limit address, the read/write apparatus 200 transmits to the non-contact type IC card 100 data including the read command, the system identifier, the card identifier, the read address, and the read password. In order to read data at higher address than the read password limit address, no password is added to the data.

Figure 3:
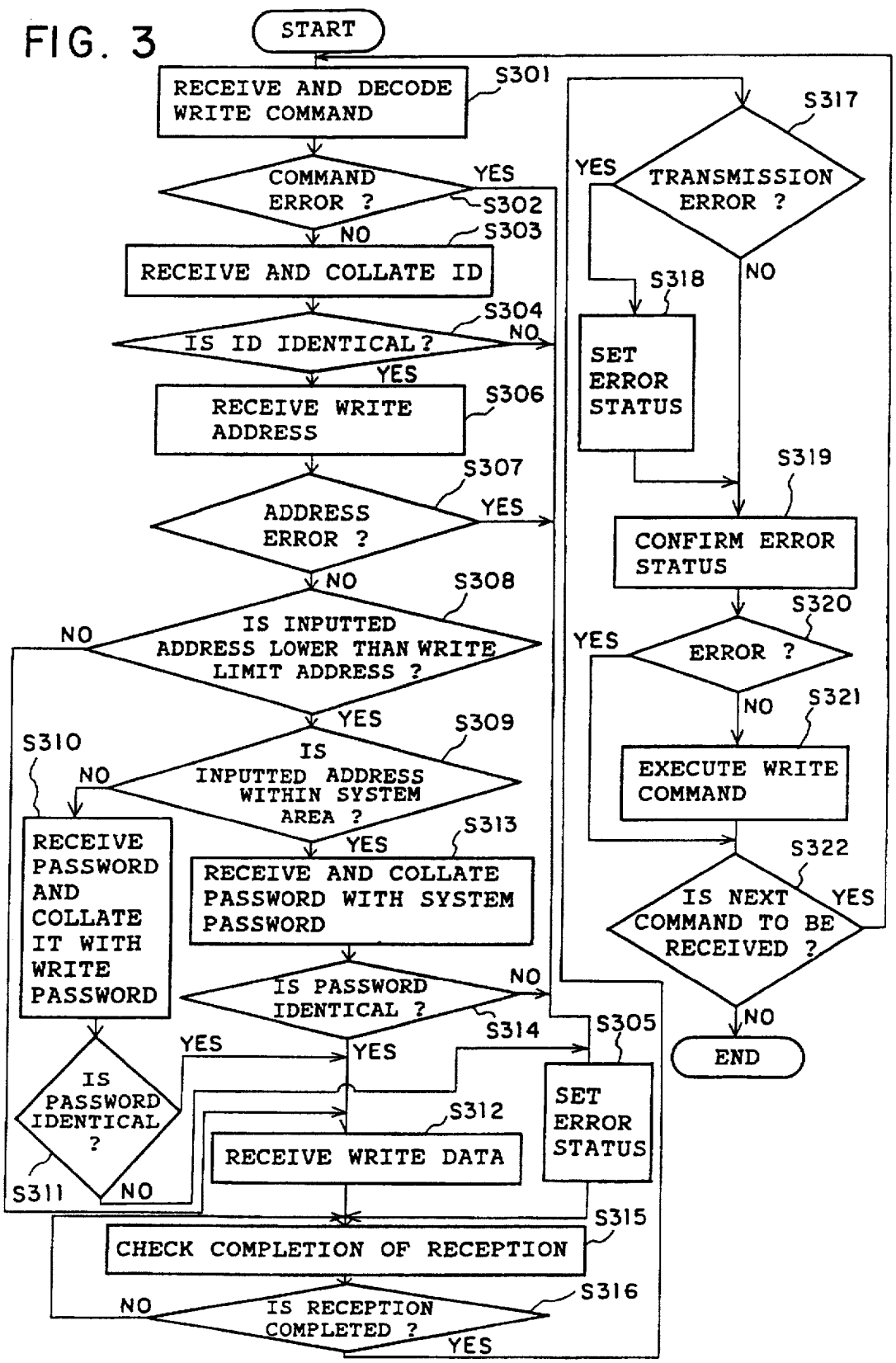
FIG. 3 is a flowchart showing the steps of processing of a write command in the first embodiment of the non-contact type IC card.

A description will now be given of the steps of processing in the non-contact type IC card 100. FIG. 3 is a flowchart showing the steps of processing of the write command in the non-contact type IC card 100. Initially, the non-contact type IC card 100 receives the command sent from the read/write apparatus 200 so as to decode the command (Step S301). When the inputted command may be a command which is not acceptable to the non-contact type IC card 100 (Step S302), a decision of command error is made to set the error status (Step S305). When no command error exists, the non-contact type IC card 100 receives the system identifier and the card identifier, and collates both the identifiers with the system identifier and the card identifier stored in the non-contact type IC card 100 (Step S303). As a result of the collation of the identifiers, when the respective identifiers may not be identical with each other (Step S304), the error status is set (Step S305). As a result of the identifier collation, when the respective identifiers are identical with each other, the non-contact type IC card 100 receives the write address (Step S306). When the inputted address causes an error (Step S307), the error status is set (Step S305). When the inputted address causes no error (Step S307), it is checked whether or not the sent address is lower than the write limit address (Step S308). When the inputted address is higher than the write limit address, the process proceeds to Step S312. Otherwise, when the inputted address is lower than the write limit address, it is checked whether or not the inputted address is within the system area SA (Step S309). When the inputted address is out of the system area SA, the IC card 100 receives an inputted write password so as to collate the password with the write password stored in the non-contact type IC card 100 (Step S310). As a result of the collation, when the write passwords are not identical with each other (Step S311), the error status is set (Step S305). When the write passwords are identical with each other in Step S311, the IC card 100 receives data to be written (Step S312). On the other hand, when the address inputted in Step S306 is an address within the system area SA (Step S309), an inputted system password is collated with the system password stored in the non-contact type IC card 100 (Step S313). As a result of the collation, when the system passwords are not identical with each other (Step S314), the error status is set (Step S305). When the system passwords are identical with each other in Step S314, the IC card 100 receives data to be written (Step S312). After reception of data at Step S312 has been completed ( Steps S315 and S316), it is checked whether or not a transmission error is caused (Step S317). If there is any transmission error, an error status is set (Step S318). Subsequently, the error status is confirmed (Step S319), and the process proceeds to Step S322 if an error is caused At Step S320. When the error status is confirmed in Step S319, and no error is caused (Step S320), the write command is executed (Step S321). When there is the next command to be received, the process returns to Step S301. In case of no next command, the process is ended (Step S322).

Figure 4:
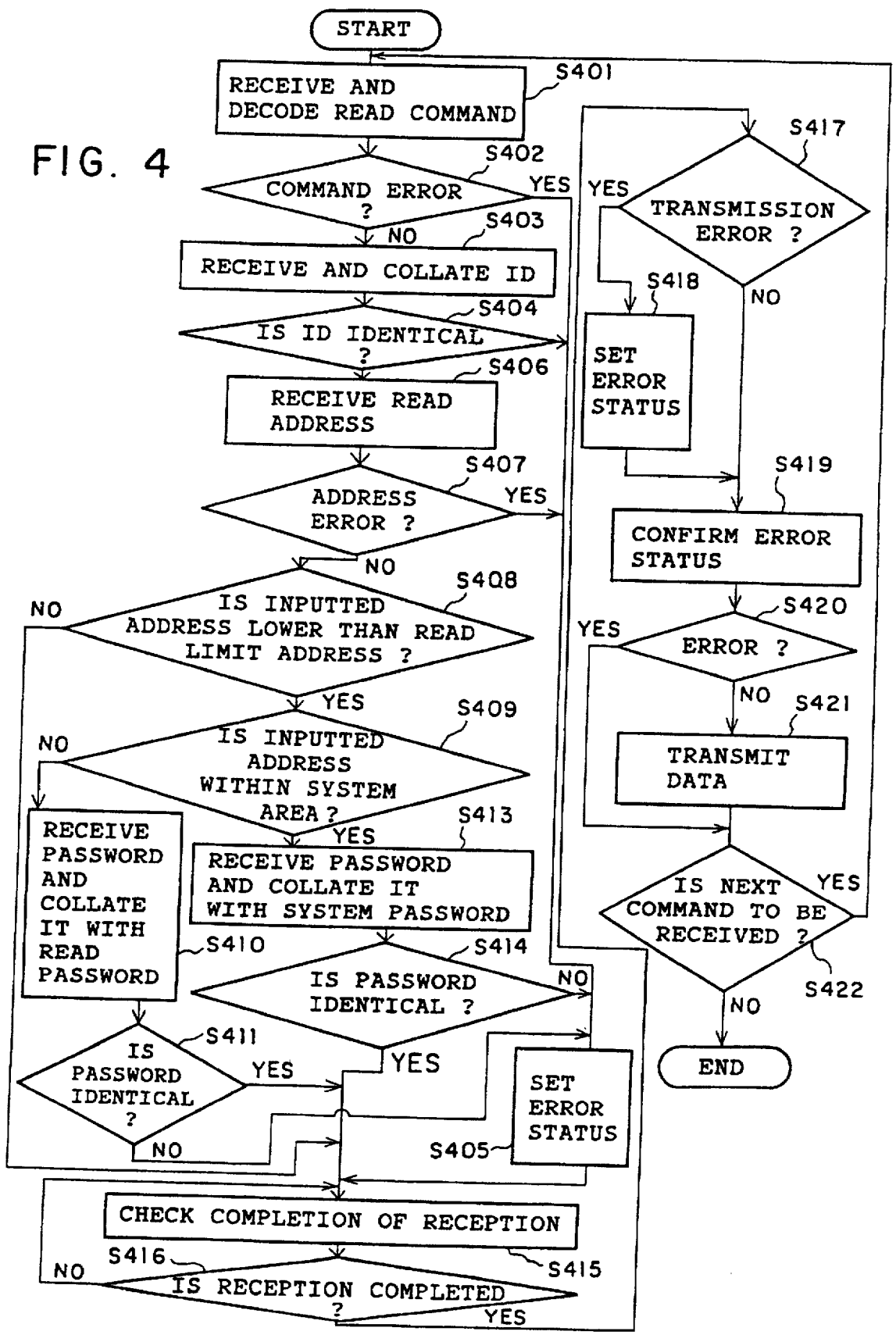
FIG. 4 is a flowchart showing the steps of processing of a read command in the first embodiment of the non-contact type IC card.

Next, a description will now be given of the operation when the read command is executed. FIG. 4 is a flowchart showing the steps in execution of the read command. The read command is executed according to a flow including the similar steps to those of the write command shown in FIG. 3. However, the flow does not include the step of receiving data, that is, the step corresponding to Step S312 in FIG. 3. Further, the read address is received in Step S406, and it is decided in Step S408 whether or not the inputted address is lower than the read limit address. In Step 410, a read password collation is made. In addition, in Step S421, data at the read address is transmitted to the read/write apparatus 200.

Figure 5:
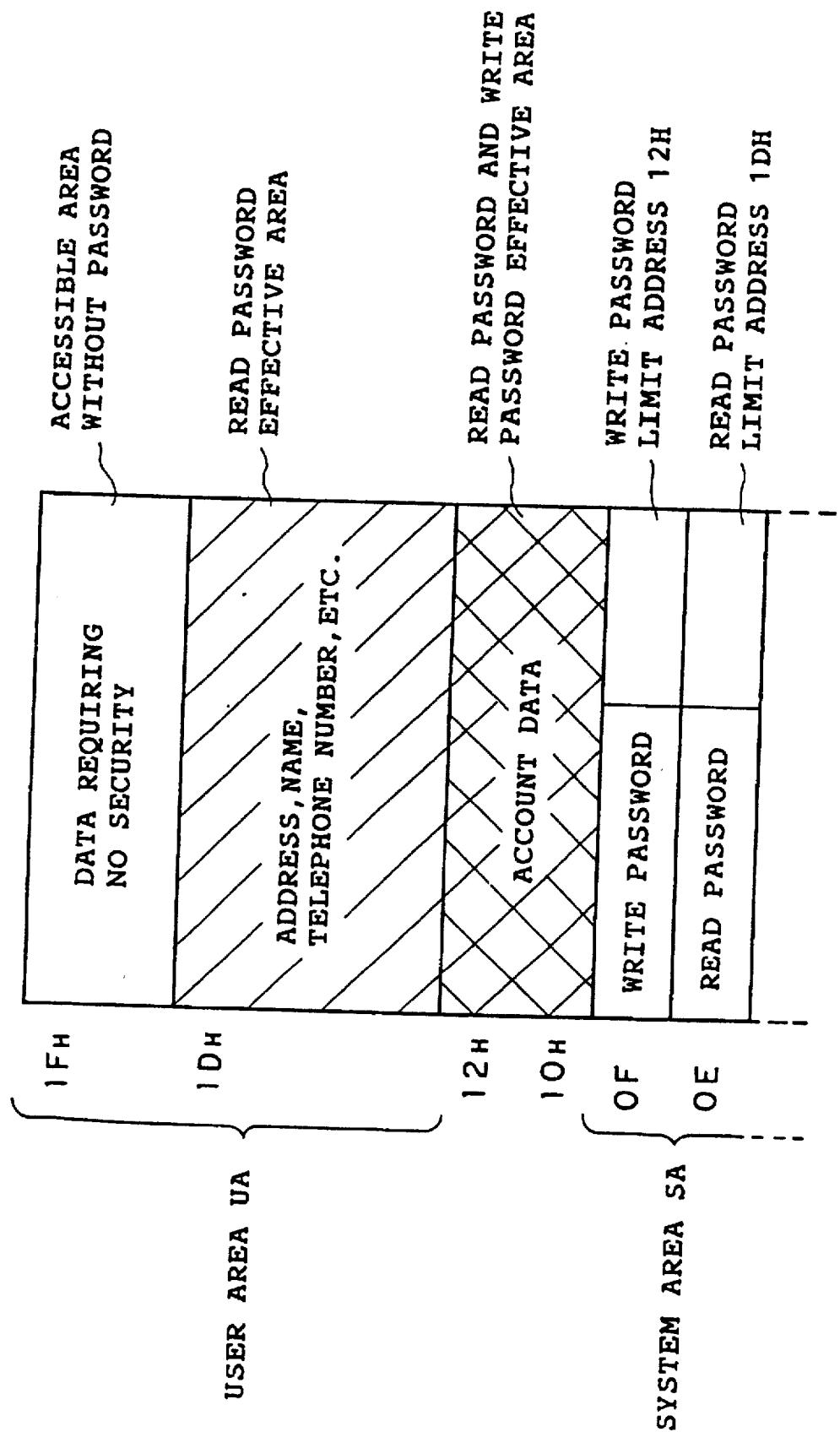
FIG. 5 is a diagram showing a memory map of the memory when the first embodiment of the non-contact type IC card is used in a certain system.

FIG. 5 is a diagram showing a memory map of the memory 140 when the non-contact type IC card 100 in this embodiment is used in a certain system. As shown in the drawing, the system area SA includes a write password, a write password limit address "12H," the read password, and the read password limit address "1DH." In this case, since the user area UA ranges form addresses "10H" to "1FH," an area in which the write password is made valid (a first area) ranges from the address "10H" to "12H," and an area in which the read password is made valid (a second area) ranges from the address "10H" to "1DH." That is, an area ranges from the address "10H" to "12H" (a third area) requires both the read password and the write password. Therefore, this area is suitable for storage of data such as account data having high degree of secrecy, and requiring read/write operation after issue of the card. The area ranges from the address "13H" to "1DH" requires only the read password. Therefore, this area is suitable for storage of data such as address, name, or telephone number, which may be only read out after the issue of the card. Further, an area ranges from the address "1EH" to "1FH" is accessible without a password. Therefore, this area is suitable for storage of data requiring no security.

As set forth above, there are provided the two passwords including the write password and the read password. It is thereby possible to control the area by dividing the area into three types of areas having different security levels. Further, it is possible to vary the size of the respective areas by varying the limit addresses. That is, it is possible to more efficiently use the memory as compared with a case where a password is provided for each block as in the prior art.

Embodiment 2

Figure 6:
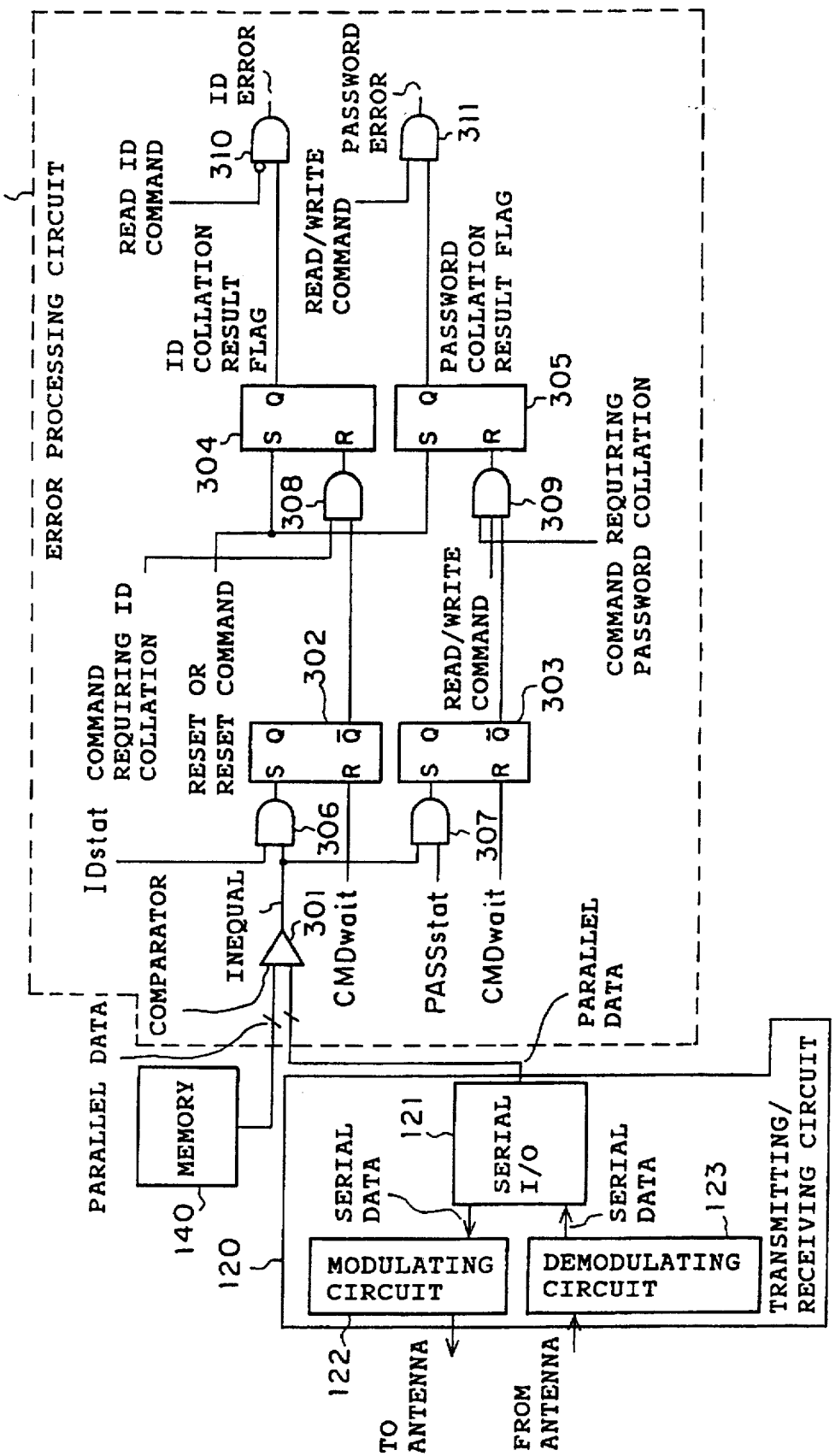
FIG. 6 is a diagram showing an error processing circuit in a control circuit, a transmitting/receiving circuit, and a memory in a second embodiment of the non-contact type IC card.

FIG. 6 is a diagram showing a part of a control circuit of a non-contact type IC card, a transmitting/receiving circuit, and a memory in the embodiment 2. In the embodiment, a basic structure is identical with that in the non-contact type IC card 100 of FIG. 1 in the embodiment 1 except the operation of the control circuit. A transmitting/receiving circuit 120 includes a serial I/O 121 which converts parallel data into serial data, and convert serial data into parallel data, a modulating circuit 122 which modulates data from the serial I/O 121 so as to feed the modulated data to a transmitting/receiving antenna 110, and a demodulating circuit 123 which demodulates a high-frequency signal from the transmitting/receiving antenna 110 so as to feed the demodulated signal to the serial I/O 121.

In the drawing, reference numeral 300a denotes an identification error and password error processing circuit in the control circuit 300. Reference numeral 301 denotes a comparator in which parallel data from a memory 140 is compared with parallel data from the serial I/O 121 in the transmitting/receiving circuit 120, and a signal "H" is outputted when the parallel data are not identical with each other. Reference numerals 302 to 305 denotes reset flip-flops, and reference numerals 306 to 311 denote AND gates.

Figure 7:
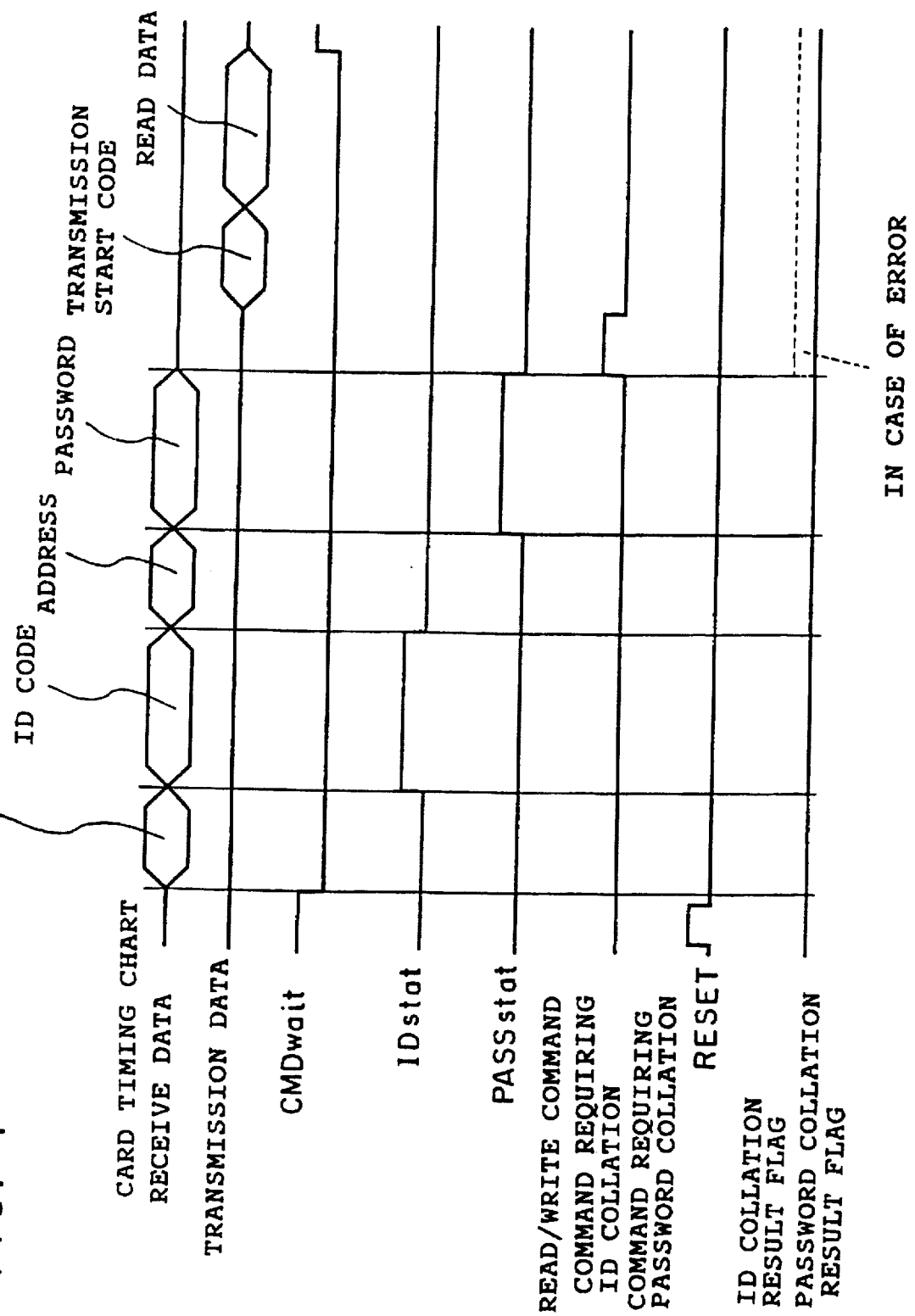
FIG. 7 is a timing chart showing timing of signals inputted into each section of the error processing circuit in the second embodiment.

FIG. 7 is a timing chart showing timing of signals inputted into each section of the identification error and password error processing circuit. A signal IDstat becomes "H" during identifier collation. A signal PASSstat becomes "H" during password collation. A signal CMDwait becomes "H" in a command waiting state (i.e., in a reception waiting state). A signal RESET is outputted when the card is switched over from a stationary state to a working state. A reset command signal is outputted when a reset command is received from a read/write apparatus 200, and is executed. A command signal requiring identifier collation is outputted at a time of execution of a command with the identification code, and a command signal requiring password collation is outputted at a time of execution of a command with the password. A read/write command signal is outputted at a time of reading from or writing onto an area requiring the password. Strictly, the read/write command signal is outputted for a period from a time immediately before confirmation of an error status to the completion of execution of the command. In this case, the command signal requiring identifier collation and the command signal requiring password collation are outputted according to the same timing as that of the read/write command. A read identifier command signal is outputted at a time of execution of a read identifier command. An identification code collation result flag can be obtained from an output Q of a flop-flop 304 (serving as identification code collation result holding means), and is reset when the identification codes are identical with each other as a result of identification code collation. A password collation result flag is reset when the passwords are identical with each other as a result of password collation. Both the flags hold their contents until the signal RESET or the reset command signal is inputted. Input of the signal RESET or the reset command sets a flop-flop 304 and a flip-flop 305 (serving as password collation result holding means).

Figure 8:
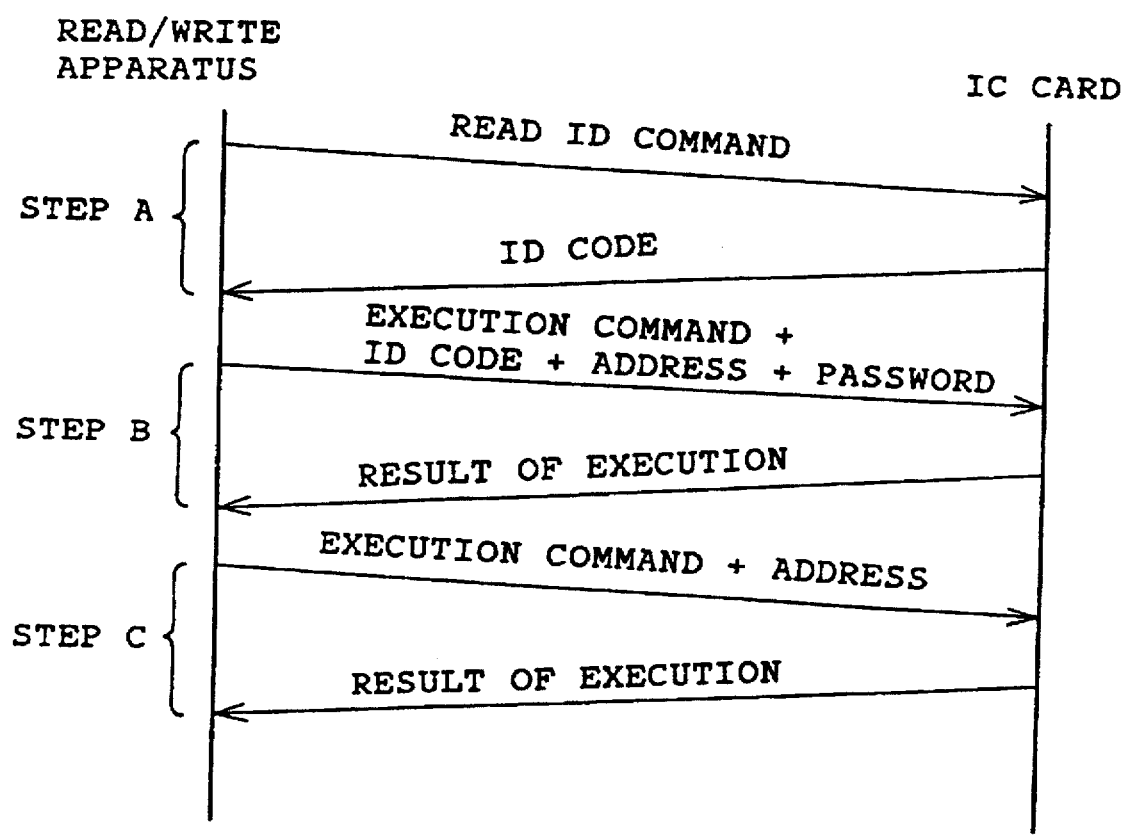
FIG. 8 is a sequence chart showing an illustrative sequence of communication between a read/write apparatus and the non-contact type IC card in the second embodiment.

FIG. 8 is a sequence chart showing an example of sequence of communication between the read/write apparatus and the non-contact type IC card. A description will now be given of a case where the IC card receives a read command for an area requiring a password from the read/write apparatus 200. Initially, the IC card receives the read identifier command from the read/write apparatus 200 so that the read identifier command signal becomes "H." Consequently, an identification error becomes "L" meaning that an error status shows no error, thereby executing the read identifier command. Thereafter, the IC card sends back the identification code serving as the result of execution to the read/write apparatus 200 (Step A). Next, the read/write apparatus 200 sends to the non-contact type IC card 100 data including an execution command (a read command), the identification code, a read address, and the password. The non-contact type IC card 100 receives the execution command so that the signal CMDwait becomes "L," and the signal IDstat subsequently becomes "H." Further, the received identification code is compared by the comparator 301 with an identification code in the memory 140. When the identification codes are identical with each other as a result of the collation, an output Q bar of the flip-flop 302 becomes "H".

Next, the IC card receives the read address so as to decide whether or not the area requires the password. In this case, the signal IDstat becomes "L". Thereafter, the signal PASSstat becomes "H" so that the received password is collated with a password stored in the memory 140. When the passwords are identical with each other as a result of the collation, an output Q bar of the flip-flop 303 becomes "H". According to timing of the read/write command signal, the command signal requiring identifier collation, and the command signal requiring password collation, the contents of the flip-flops 302 and 303 are respectively stored in the flip-flops 304 and 305 as an identifier collation result flag and a password collation result flag.

If the identification code sent from the serial I/O 121 is different from the identification code stored in the memory 140, the comparator 301 outputs a signal "H". As a result, the flip-flop 302 is set so that the output Q bar outputs a signal "L" to avoid reset of the flip-flop 304. Since the flip-flop 304 is set by the signal RESET or the reset command signal in its initial state, the identifier collation result flag becomes "H" to indicate the identification error. Alternatively, when the passwords are not identical with each other, a password error is outputted according to a similar operation.

The identification error or the password error should be confirmed in order to execute a command, and the command can be executed only when no error is caused. Further, the IC card sends back the result of execution to the read/write apparatus 200 (Step B). In order to subsequently read data at another address requiring the password, the read/write apparatus may send only an execution command and an address so that the command can be executed in the IC card (Step C). That is, since the identification code and the password have been collated in Step B, commands can be executed without sending the identification code and the password in Step C and subsequent Steps. As a result, it is possible to considerably reduce an amount of transmission data. In addition, during communication between the IC card whose collation is finished and the read/write apparatus, another IC card whose collation is not finished may enter a communication area. Even in such a case, the latter IC card never executes the command erroneously because, in each IC card, the flip-flops 304 and 305 are set, after reset operation, such that the identifier collation result flag and the password collation result flag show inequality.

Embodiment 3

Figure 9:
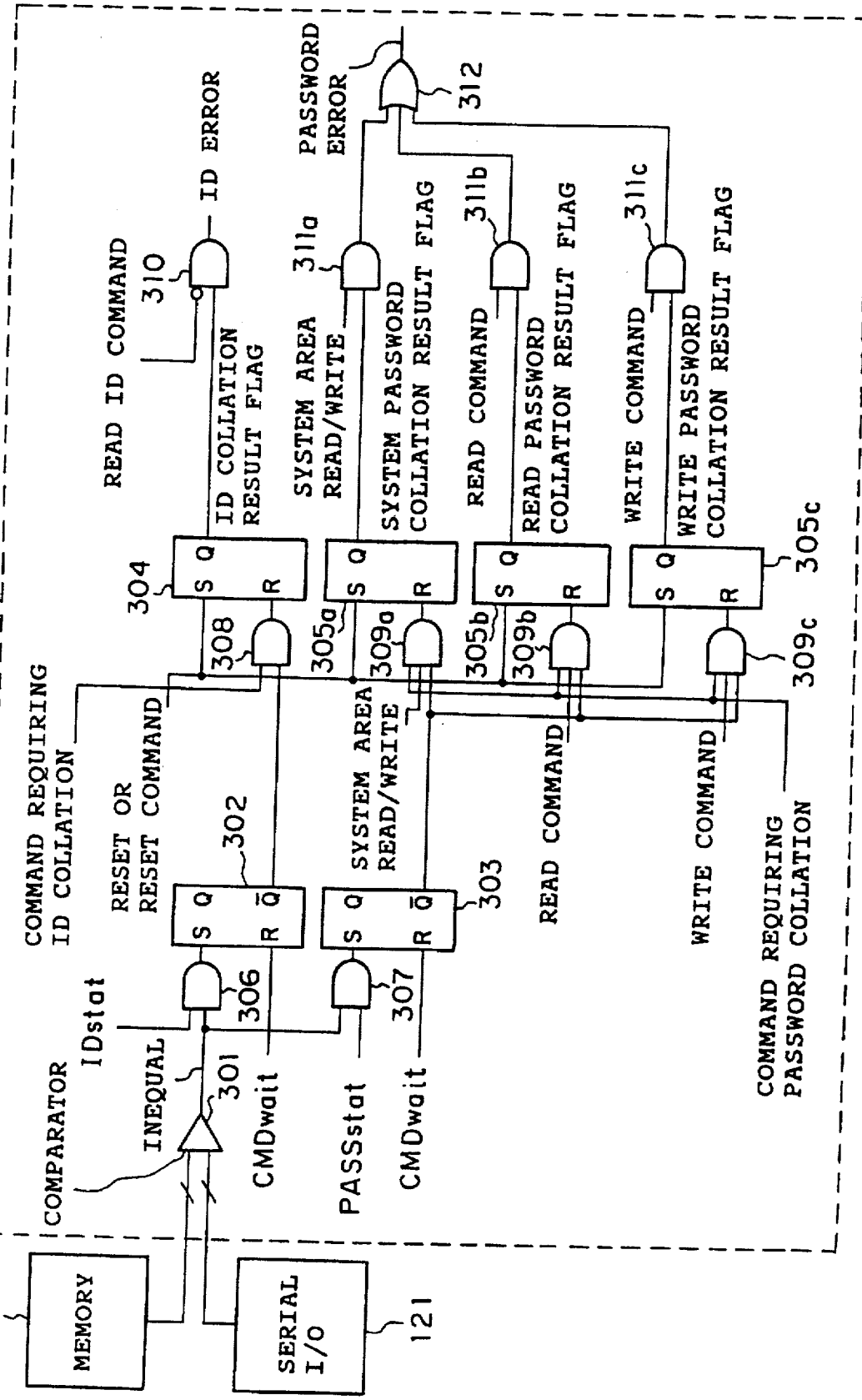
FIG. 9 is a diagram showing a structure of an error processing circuit in a control circuit in a third embodiment of the non-contact type IC card.

FIG. 9 is a diagram showing a structure of an error processing circuit in a control circuit of a non-contact type IC card in the embodiment 3 of the present invention. In the drawing, the same reference numerals are used for component parts identical with those shown in FIG. 6, and duplicate descriptions thereof are omitted.

Reference numeral 300b denotes the error processing circuit of the control circuit in the non-contact type IC card 100. Reference numerals 309a, 309b, 309c, 311a, 311b, and 311c denote AND gates, 305a denotes a flip-flop (serving as system password collation result holding means) which holds a system password collation result flag, 305b denotes a flip-flop (serving as read password collation result holding means) which holds a read password collation result flag, 305c denotes a flip-flop (serving as write password collation result holding means) which holds a write password collation result flag, and 312 denotes an OR gate in which error signals outputted from the AND gates 311a, 311b, and 311c are ORed. A system area read/write signal is outputted at a time of execution of a read/write command for a system area. A read command signal is outputted at a time of execution of a read command for an area requiring a password in a user area. A write command signal is outputted at a time of execution of a write command for an area requiring a password in the user area. These signals are outputted according to the same timing as that of the read/write command signal as described in the embodiment 2.

A description will now be given of the operation. In this embodiment, since an identification error signal is outputted as in the embodiment 2 whose structure is shown in FIG. 6, a duplicate description thereof is omitted. Thus, a description will be given of output of a password error signal in view of points different from the embodiment 2. Though only one flip-flop is provided to hold the result of password collation in the embodiment 2, in this embodiment, flip-flops 305a, 305b, and 305c are respectively provided for a system password, a read password, and a write password. That is, the passwords are respectively collated in cases of the read/write command for the system area, the read command for the user area, and the write command for the user area. Subsequently, the results of the collation from the flip-flop 303 are stored in the flip-flops 305a, 305b, and 305c. Since the collation has been made to the respective passwords for the commands, subsequent password collation for subsequent commands can be omitted. Instead of collation, by referring to the password collation result flags stored in the flip-flops 305a, 305b, and 305c, the OR gate 312 outputs a password error signal indicating presence or absence of a password error.

Therefore, the results of collation for the three passwords can independently be stored. It is thereby possible to independently check the password error when case the system password, the write password, and the read password are employed as described in the embodiment 1. For example, after execution of the read command for the area requiring the password, the write command without password collation for the area requiring the password may be sent. In this case, in the embodiment 2, the write command is inevitably executed. However, in this embodiment, the respective passwords are independently checked so that the write command is never directly executed even in such a case. Therefore, it is possible to check the password error with higher security.

Embodiment 4

Figure 10:
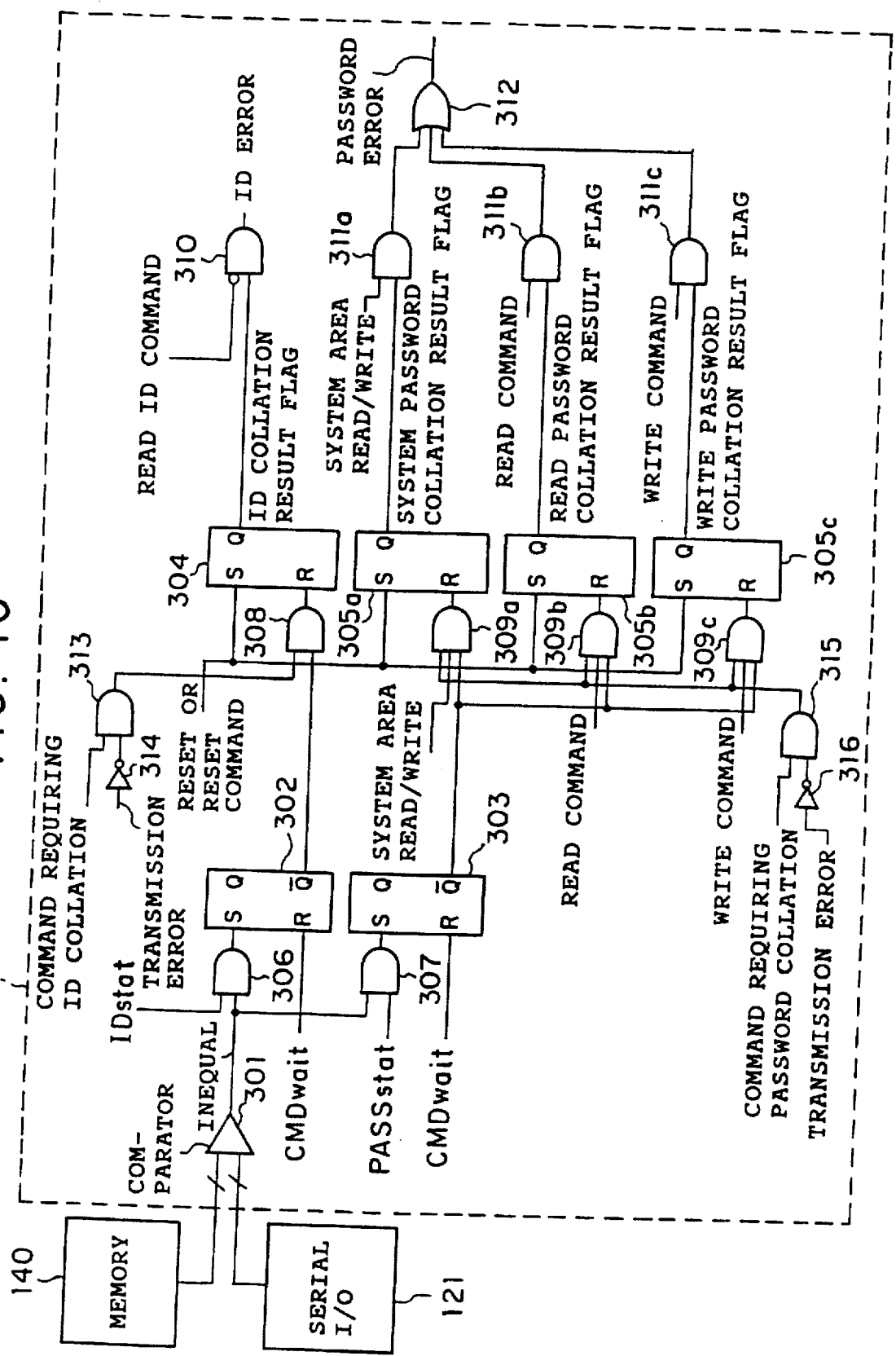
FIG. 10 is a diagram showing a structure of an error processing circuit in a control circuit in a fourth embodiment of the non-contact type IC card.

FIG. 10 is a diagram showing a structure of an error processing circuit in a control circuit of a non-contact type IC card in the embodiment 4 of the present invention. In the drawing, the same reference numerals are used for component parts identical with those shown in FIG. 9, and duplicate descriptions thereof are omitted.

Figure 11:
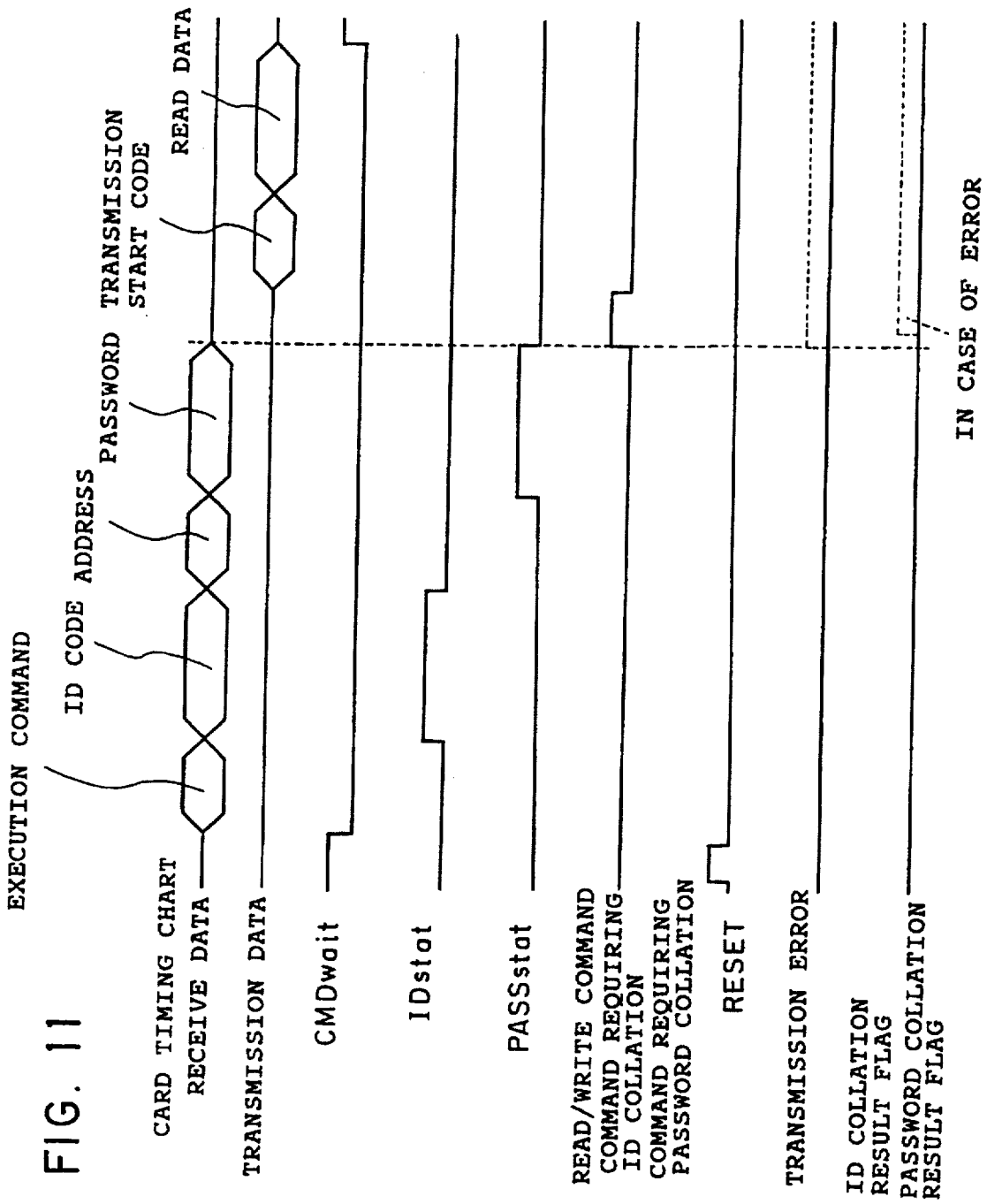
FIG. 11 is a timing chart showing timing of signals inputted into each section of the error processing circuit in the fourth embodiment.

Reference numeral 300c denotes the error processing circuit of the control circuit in the non-contact type IC card 100, 313 and 315 denote AND gates, and 314 and 316 denote inverters. Transmission error signals are inputted into the inverters 314 and 316. FIG. 11 is a timing chart showing timing of signals inputted into each section of the error processing circuit in this embodiment. As shown in the drawing, when a transmission error is caused, the transmission error signal becomes "H" immediately after a password is received.

A description will now be given of the operation. In the error processing circuit in the embodiment 4, the results of collation of the identification code and the password are not directly set as flags in flip-flops 304, 305a, 305b, and 305c. After the completion of reception, it must be checked that no transmission error is caused before the results can be set as the flags in the flip-flop. Therefore, according to the embodiment, it is possible to enhance reliability of the operation of the non-contact type IC card even in a circumstance in which a transmission error may possibly be caused.

Embodiment 5

Figure 12:
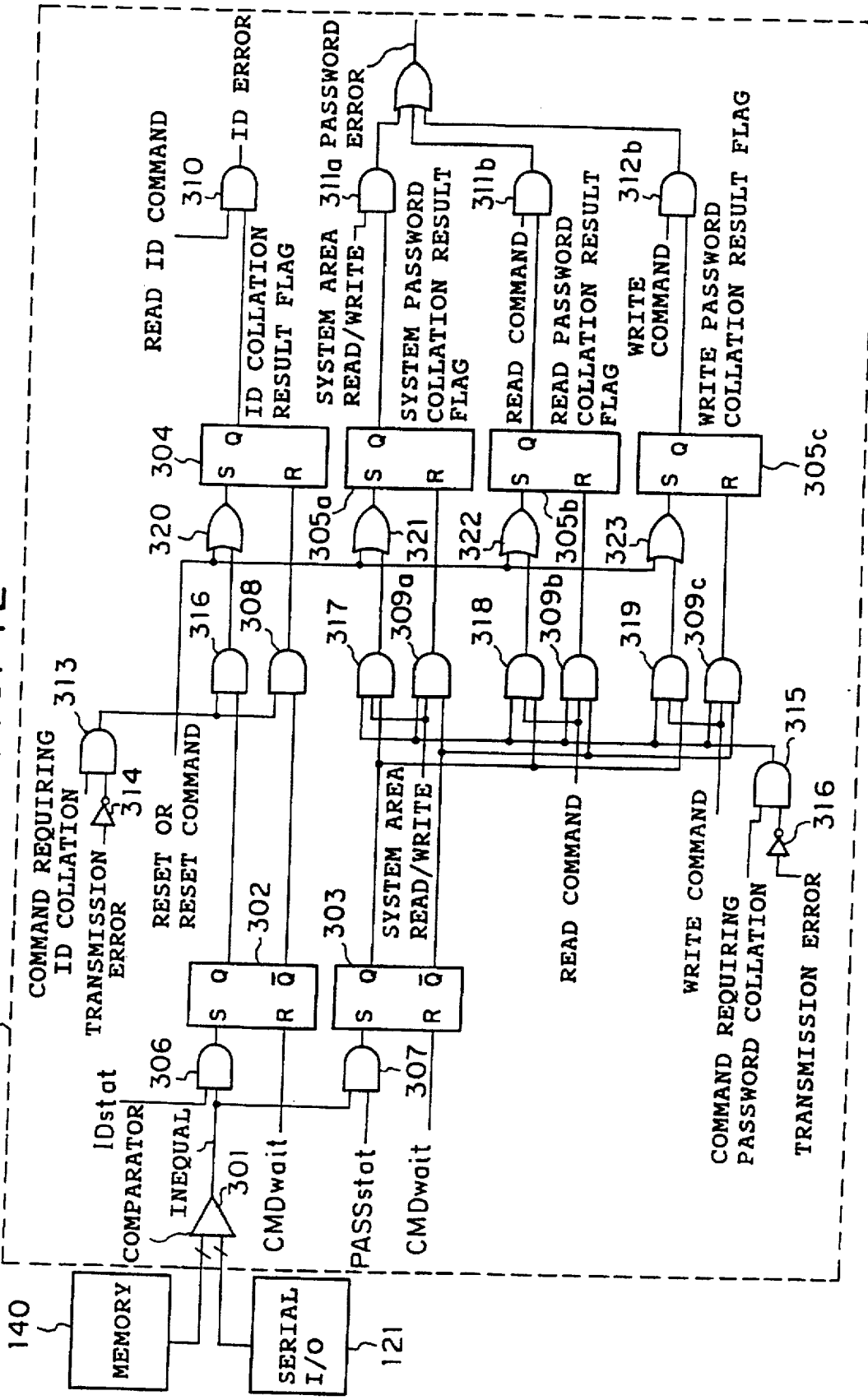
FIG. 12 is a diagram showing a structure of an error processing circuit in a control circuit in a fifth embodiment of the non-contact type IC card.
Figure 13:
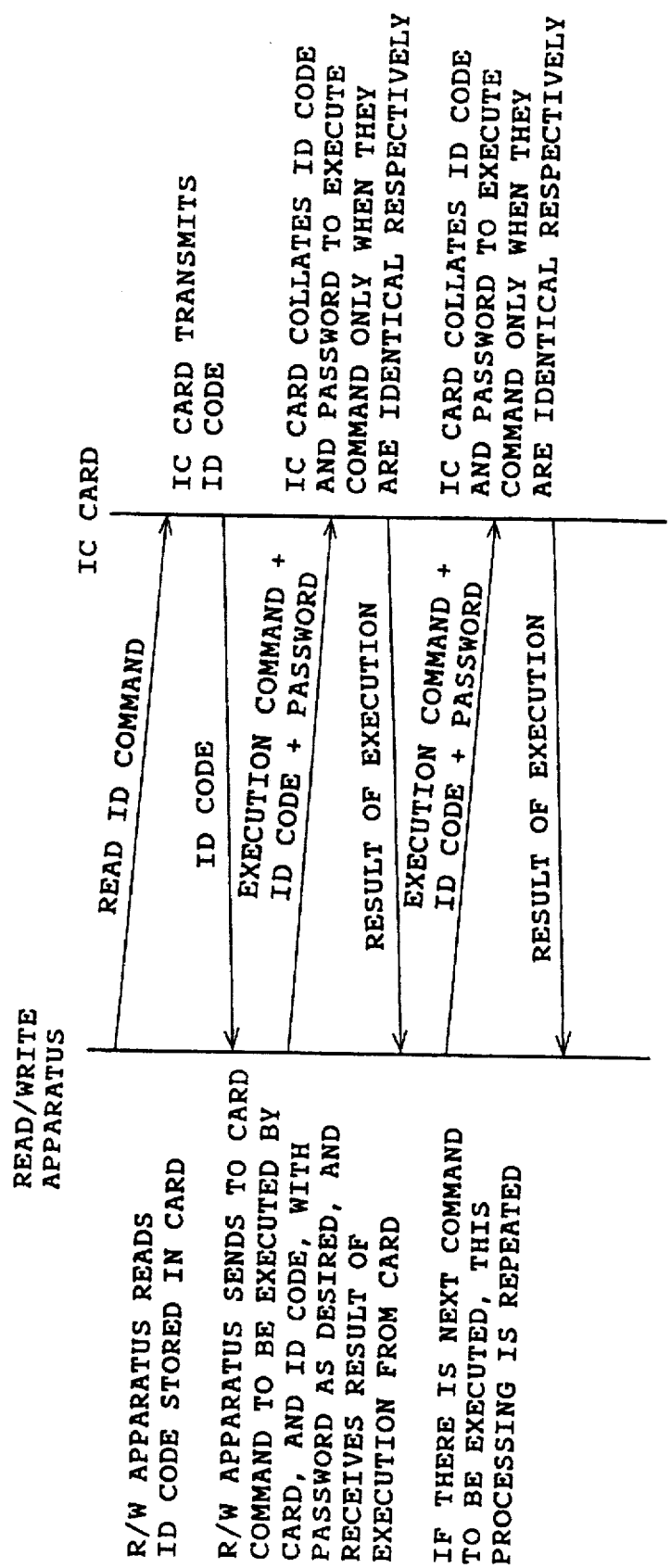
FIG. 13 is a sequence chart showing communication between an IC card and a read/write apparatus in a conventional non-contact type IC card system.
Figure 14:
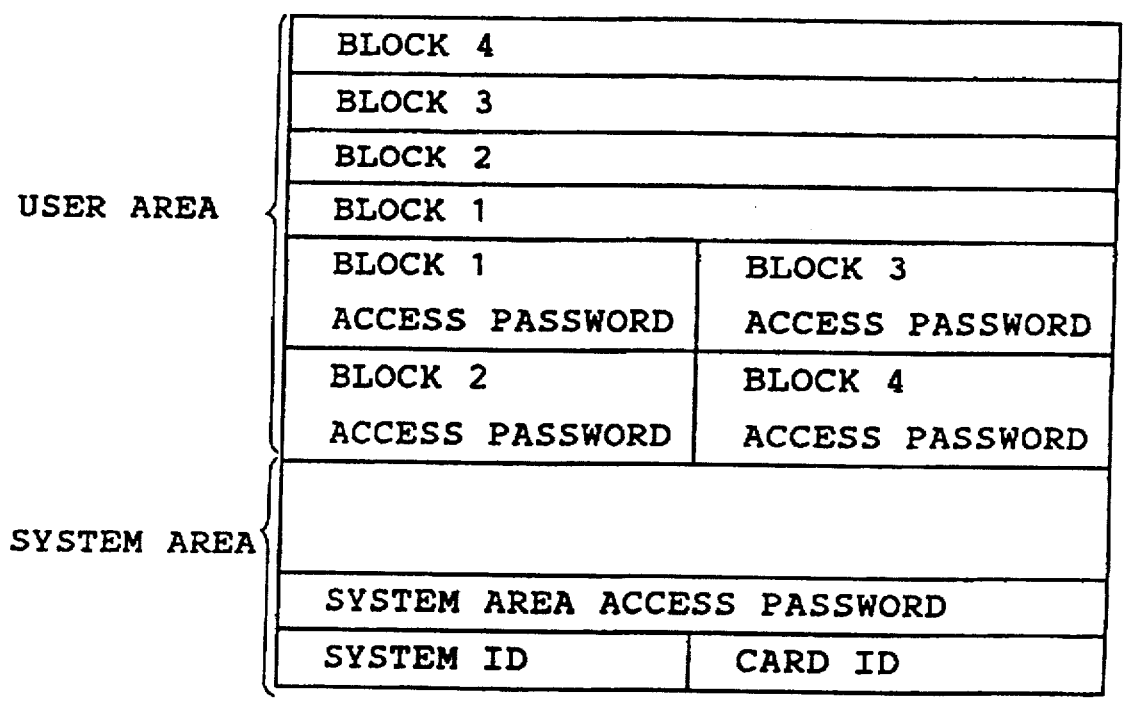
FIG. 14 is a diagram showing a memory map in the conventional IC card.

FIG. 12 is a diagram showing a structure of an error processing circuit in a control circuit of a non-contact type IC card in the embodiment 5 of the present invention. In the drawing, the same reference numerals are used for component parts identical with those shown in FIG. 11, and duplicate descriptions thereof are omitted.

Reference numeral 300d denotes the error processing circuit of the control circuit in the non-contact type IC card 100, reference numerals 316 to 319 denote AND gates, and reference numerals 320 to 323 denote OR gates.

A description will now be given of the operation. In the embodiments 2 to 4, the structures are provided on condition that, after the identification code and the password are once collated, a command requiring identification code collation and password collation is not subsequently inputted. In this embodiment, the identification code collation and the password collation are correctly made each time the command requiring the identification code collation and the password collation is inputted. If a command without identification code collation and password collation is inputted, an identification error signal and a password error signal is outputted by referring to flags stored in flip-flops 304, 305a, 305b, and 305c.

Initially, a description will be given of the actual circuit operation during the identification code collation. In the embodiments 2 to 4, the flip-flop 304 can be set only when the signal RESET or the reset command signal is inputted. In this embodiment, an output Q of a flip-flop 302 outputs a signal "H" to the AND gate 316, and the flip-flop 304 can also be set by the OR gate 320 when an AND gate 313 outputs a signal "H". That is, the identification codes are collated by a comparator 301, and in case of inequality of the identification codes, the AND gate 306 outputs a signal "H" so that an output Q of the flip-flop 302 becomes "H". Further, the AND gate 313 outputs "H" when the command requiring the identification code collation is inputted without transmission error. Hence, the AND gate 316 outputs a signal "H" to the OR gate 320 so that output of the OR gate 320 becomes "H", thereby setting an output Q of the flip-flop 304 to the signal "H" as an identification collation flag indicating error. As a result, even if a plurality of commands requiring identifier collation are inputted, the identification code is correctly collated for each input of the command. Since each password collation can also be made similarly to the above operation, descriptions thereof are omitted. As set forth above, each time the command requiring the identification code collation and the password collation is inputted, it is possible to precisely collate the identification code and the password. As a result, it is possible to improve an efficiency of data transmission, and ensure higher security.

While preferred embodiments of the invention have been described using specific terms, such description is for illustrative purposes only, and it is to be understood that changes and variations may be made without departing from the spirit or scope of the following claims.

What is claimed is:

1. An IC card for communicating with a read/write apparatus, the IC card comprising:

a memory for storing data, divided into a system area and a user area, the system area including an area storing a write password used for collation when data is written onto a first area in the user area, an area storing a read password used for collation when data is read out from a second area in the user area, and an area storing a system password used for collation when data is written to or read from the system area, the memory having a third area included in the first area and also in the second area;

write password collating means for, when a write command for the first area is sent together with a password from the read/write apparatus, collating the password with the write password stored in the memory so as to decide whether or not the passwords are identical with each other;

read password collating means for, when a read command for the second area is sent together with a password from the read/write apparatus, collating the password with the read password stored in the memory so as to decide whether or not the passwords are identical with each other;

system password collating means for, when a read or write command for the system area is sent together with a password from the read/write apparatus, collating the password with the system password stored in the memory so as to decide whether or not the passwords are identical with each other; and command executing means for executing a command sent from the read/write apparatus when the respective passwords are identical with those stored in the memory depending upon results of collation in the write password collating means, the read password collating means, and the system password collating means.

2. An IC card according to claim 1, further comprising:

write password collation result holding means for holding the result of password collation made by the write password collating means;

read password collation result holding means for holding the result of password collation made by the read password collating means; and system password collation result holding means for holding the result of password collation made by the system password collating means, wherein, when a command is sent with a password from the read/write apparatus, the command executing means executes the command sent from the read/write apparatus when the password is identical with that stored in the memory depending upon the results of collation in the write password collating means, the read password collating means, and the system password collating means, and wherein, when a command is sent without a password from the read/write apparatus, the command executing means executes the command depending upon the result of collation held in the write password collation result holding means, the read password collation result holding means, or the system password collation result holding means.

3. An IC card for communicating with a read/write apparatus, the IC card comprising:

a memory for storing data, divided into a system area and a user area, the system area including an area storing a password used for collation when the memory is accessed;

password collating means for, when a command for access to the memory is inputted together with a password from the read/write apparatus, collating the password with the password stored in the memory so as to decide whether or not the passwords are identical with each other;

password collation result holding means for holding a result of password collation made by the password collating means; and command executing means for, when a command for access to the memory is inputted together with a password from the read/write apparatus, executing the command if coincidence is obtained in collation in the password collating means, and for, when a command for access to the memory is inputted without a password from the read/write apparatus, executing the command if information indicating coincidence of the password is held by the password collation result holding means and not executing the command if information indicating coincidence of the password is not held by the password collation result holding means, wherein the system area has an area storing an identification code, the IC card further comprising identification code collating means, for when an identification code is sent together with a command from the read/write apparatus, collating the identification code with the identification code stored in the memory so as to decide whether or not the identification codes are identical with each other; and identification code collation result holding means for holding a result of collation in the identification code collating means, wherein, when a command is sent together with an identification code from the read/write apparatus, the command executing means executes the command depending upon the result of collation in the identification code collating means, and when a command is sent without an identification code from the read/write apparatus, the command executing means executes the command depending upon the result of collation held in the identification code collation result holding means.

4. An IC card for communicating with a read/write apparatus, the IC card comprising:

a memory for storing data, divided into a system area and a user area, the system area including an area storing a password used for collation when the memory is accessed;

password collating means for, when a command for access to the memory is inputted together with a password from the read/write apparatus, collating the password with the password stored in the memory so as to decide whether or not the passwords are identical with each other;

password collation result holding means for holding a result of password collation made by the password collating means; and command executing means for, when a command for access to the memory is inputted together with a password from the read/write apparatus, executing the command if coincidence is obtained in collation in the password collating means, and for, when a command for access to the memory is inputted without a password from the read/write apparatus, executing the command if information indicating coincidence of the password is held by the password collation result holding means and not executing the command if information indicating coincidence of the password is not held by the password collation result holding means, wherein the password collation result holding means holds the result of password collation only when no transmission error is caused in communication at a time of transmission of the command from the read/write apparatus.

5. An IC card according to claim 3, wherein the identification code collation result holding means holds the result of identification code collation only when no transmission error is caused in communication at a time of transmission of the command from the read/write apparatus.

* * * * *